United States Patent
Kumar

(10) Patent No.: US 6,261,337 B1
(45) Date of Patent: Jul. 17, 2001

(54) LOW OXYGEN REFRACTORY METAL POWDER FOR POWDER METALLURGY

(76) Inventor: Prabhat Kumar, c/o H.C. Starck, Inc. 45 Industrial Pl., Newton, MA (US) 02461-1951

( * ) Notice: Subject to any disclaimer, the term of this patent is extended or adjusted under 35 U.S.C. 154(b) by 0 days.

(21) Appl. No.: 09/377,077

(22) Filed: Aug. 19, 1999

(51) Int. Cl.7 .................................................. B22F 9/20
(52) U.S. Cl. .............................. 75/255; 75/364; 75/369
(58) Field of Search .............................. 75/255, 364, 369

(56) References Cited

U.S. PATENT DOCUMENTS

| | | | |
|---|---|---|---|
| 5,082,491 | * | 1/1992 | Rerat ....................................... 75/255 |
| 5,242,481 | * | 9/1993 | Kumar ..................................... 75/364 |
| 5,409,518 | * | 4/1995 | Saito et al. ............................... 75/44 |
| 5,954,856 | * | 9/1999 | Pathare et al. ........................... 75/255 |

* cited by examiner

*Primary Examiner*—Daniel Jenkins
(74) *Attorney, Agent, or Firm*—Perkins, Smith & Cohen, LLP; Jerry Cohen

(57) ABSTRACT

One step process for producing formed Ta/Nb powder metallurgy products using Ta and/or Nb hydride powders with an oxygen content greater than a target level, e.g., 300 ppm, heating the metal hydride in the presence of another metal having a higher affinity for oxygen, removing the other metal and any reaction byproducts, to form a metal powder with an oxygen content less than the target level and forming a metallurgical product from said oxygen reduced Ta/Nb powder with an oxygen content less than the target level.

15 Claims, No Drawings

LOW OXYGEN REFRACTORY METAL POWDER FOR POWDER METALLURGY

FIELD AND BACKGROUND OF THE INVENTION

The present invention relates to powders and products of tantalum, niobium, and their alloys having low oxygen contents, and processes for producing the same.

One common method of producing powder metal products of tantalum, niobium or alloys of such metals with each other, and either or both with other metals, is to first cold isostatically press the powder into a preform, such as a bar or rod. The preform is resistance sintered at a relatively high temperature to produce a formed product of tantalum, niobium or their alloys. Generally, for resistance sintering, the ends of the preform are clamped between water-cooled copper terminals in a high vacuum chamber and then the preform is heated by passing an electrical current through the preform. The resistance sintering simultaneously lowers the oxygen content and densifies the preform.

However, there are many disadvantages in utilizing resistance sintering to densify and remove oxygen. First, resistance sintering may only be utilized to produce products of certain limited shapes, generally bars or rods. For resistance sintering, the cross-section of the preform must be uniform along the path of electrical current in order to prevent localized overheating and hot shorting. Additionally, the cross section must be small enough so that the oxygen reduction in the center of the preform occurs before the disappearance of the interconnected porosity. For effective oxygen removal, preforms greater than about 1.5 inches in their shortest dimension are not resistance-sintered. Still further the preform must be small enough to prevent sagging associated with creep and hot pressing during unsupported resistance sintering. Thus, the preforms generally do not weigh greater than about 35 lbs.

The present invention relates to tantalum and/or niobium powder and more particularly to tantalum powders usable in making powder metallurgy components that can be further processed into rod, wire, sheet, foil and other mill or fabricated parts or simply made in net-shape by conventional powder consolidation methods followed by surface finishing and/or small dimensional modifications. Such products are also usable as fully dense coatings to modify the surface chemistry of other mill products or fabricated parts.

It is well known to make tantalum powders for use as sintered anodes for electrolytic capacitors, by hydriding an ingot or chips from an ingot of tantalum, comminuting (taking advantage of the embrittlement that results from this massive hydriding) to powder form and then dehydriding to form tantalum powder. Such powders can be used to produce capacitors with low electrical leakage. In principle such process is also applicable to niobium but it is not very practical.

It is also known to deoxidize tantalum or niobium capacitor powders (however made) in primary or secondary (agglomerated) forms by contact with vapors of alkaline earn, metals to effectively getter oxygen at the powder surface and remove it as an alkaline earth, metal oxide by acid leaching and/or volatilization.

SUMMARY OF THE INVENTION

The invention comprises new powders of tantalum, niobium or alloys of tantalum or niobium having an oxygen content of less than about 300 ppm, preferably below 200 ppm and more preferably below 100 ppm. The invention also comprises a method for producing these powders wherein hydrides of tantalum, niobium or alloy powders are heated in the presence of an oxygen-active metal, such as magnesium.

The invention also comprises formed powder metal products having oxygen contents less than about 300 ppm, preferrably below 200 ppm and more preferrably below 100 ppm, formed from tantalum, niobium, and their alloys. I have still further discovered a new process for producing formed powder metal products of tantalum, niobium and their alloys, having very low oxygen contents without resistance sintering.

The present invention utilizes a combination and variation of the two lines of very old prior art development outlined above, taken together with the further realization that this is a way to achieve a powder of very fine size with low oxygen usable in mill products/fabricated parts manufacture. Normally the achievement of fine size (and related high surface area) of powder is associated with high oxygen pick-up deleterious to subsequent processing and use.

It is a principal object of the present invention to provide a method of achieving fine tantalum and/or niobium powder with low oxygen, preferably averaging under 150 micrometer (micron) size and below 300 ppm of oxygen, preferrably below 200 ppm and more preferrably below 100 ppm.

This is accomplished by providing a fine size of tantalum hydride powder of minus 150 microns and mixing it with a small amount of magnesium or calcium, less than ½% of the hydride weight. A precursor of the alkaline earth metal such as a hydride thereof can also be employed. The mixture is heated in a ramping up heating schedule to vaporize the alkaline earth metal and to start reduction of oxygen by the vapor, holding to complete the reaction of oxygen, then cooling, and acid and water washing to leach off residual alkaline earth metal and drying to yield a tantalum powder of low oxygen (typically under 150 ppm) and particle size averaging under 150 microns FAPD (Fisher Average particle Diameter).

An advantage of the powder of the present invention is that it comprises relatively non-spherical particles suited for unidirectional mechanical pressing.

A further advantage of the powder of the present invention is that it comprises relatively small particles well suited for cold isostatic pressing.

An advantage of the formed products of tantalum, niobium or their alloys, of the present invention, is that the products can be of any shape, cross-section or size.

An advantage of the process for producing formed products of the present invention is that the process allows for the production of tantalum, niobium, or alloy formed products having low oxygen content as described above and being of any shape cross-section or size.

In addition to application for Ta, Nb and alloys (Ta—Nb), the invention can also be applied to other refractory metals, e.g., Mo, W, Ti, Zr, Hf, Re and alloys of the same with each other and/or Nb or Ta.

DETAILED DESCRIPTION OF PREFERRED EMBODIMENTS OF THE INVENTION

The metal powders of low oxygen content of the present invention are produced via the following procedure.

A first metal (tantalum, niobium or alloy) hydride powder is placed into a vacuum chamber, which also contains a metal having a higher affinity for oxygen than the first metal, such as calcium or magnesium, preferably the latter. Preferably, the starting hydride powder has an oxygen content less than about 1000 ppm. The chamber is then heated to the deoxidation temperature to produce a powder of tantalum, niobium or alloy of tantalum or niobium having a target reduced oxygen content of less than about 300 ppm preferrably below 200 ppm and more preferably below 100 ppm. The magnesium, containing the oxygen, is then removed from the metal powder by evaporation and subsequently by selective chemical leaching or dissolution of the powder.

The alloys of tantalum or niobium of the present invention include alloys of tantalum and/or niobium, either or both with other metals, and further includes incorporation of an oxide, which has a higher free energy of formation than Ta and/or Nb oxide, such as for example yttrium oxide, thorium oxide, or aluminum oxide. The oxide is blended into the tantalum and/or niobium powder having oxygen content of less than about 300 ppm. The alloys of the present invention also include alloys of tantalum and/or niobium and a further alloying element with a low oxygen content blended into the tantalum or niobium powder, provided that the oxygen content of the blend is less than about 300 ppm. The alloys of the present invention further include alloys of tantalum and/or niobium hydride and a further alloying element wherein the alloying element and the tantalum and/or niobium hydride powder are blended prior to deoxidation to form the alloy having the low oxygen content. The alloys of the present invention still further include alloys of tantalum and/or niobium and a further alloying element wherein the oxygen addition associated with the alloying element does not raise the oxygen content of the alloy above 300 ppm.

As described above, in the process for producing formed powder metal products of tantalum, niobium and their alloys, the metal hydride powder is deoxidized to an oxygen content of less than about 300 ppm. The powder is consolidated to form a tantalum, niobium or alloy product, having an oxygen content below about 300 ppm or 200 ppm or below 100 ppm, but for many powder metallurgy purposes between about 100 ppm and 150 ppm.

According to the present invention, a formed tantalum niobium or alloy product, having the low oxygen content, may be produced from metal hydride powder by any known powder metallurgy techniques. Exemplary of these powder metallurgy techniques used for forming the products are the following, in which the steps are listed in order of performance. Any of the following single techniques or sequences of techniques may be utilized in the present invention:

cold isostatic pressing, sintering, encapsulating, hot isostatic pressing and thermomechanical processing;

cold isostatic pressing, sintering, hot isostatic pressing and thermomechanical processing;

cold isostatic pressing, encapsulating, hot isostatic pressing and thermomechanical processing;

cold isostatic pressing, encapsulating and hot isostatic pressing;

encapsulating and hot isostatic pressing;

cold isostatic pressing, sintering, encapsulating, extruding and thermomechanical processing;

cold isostatic pressing, sintering, extruding, and thermomechanical processing;

cold isostatic pressing, sintering, and extruding;

cold isostatic pressing, encapsulating, extruding and thermomechanical processing;

cold isostatic pressing, encapsulating and extruding;

encapsulating and extruding;

mechanical pressing, sintering and extruding;

cold isostatic pressing, sintering, encapsulating, forging and thermomechanical processing;

cold isostatic pressing, encapsulating, forging and thermomechanical processing;

cold isostatic pressing, encapsulating and forging;

cold isostatic pressing, sintering, and forging;

cold isostatic pressing, sintering and rolling;

encapsulating and forging;

encapsulating and rolling.

cold isostatic pressing, sintering and thermomechanical processing;

spray depositing;

mechanical pressing and sintering;

mechanical pressing, sintering, repressing and resintering;

plasma assisted hot pressing;

plasma assisted hot pressing and extruding;

plasma assisted hot pressing and thermomechanical processing;

plasma assisted hot pressing, extruding and thermomechanical processing.

Other combinations of consolidating, heating and deforming may also be utilized.

The effectiveness and advantages of the products and processes of the present invention will be further illustrated by the following non-limiting examples.

EXAMPLE 1

This example illustrates production of a tantalum powder with less than 300 ppm oxygen by deoxidation of tantalum hydride under a partial pressure of argon. Tantalum hydride powder, made by a conventional method as described above, was blended with 0.3 wt. % Mg powder and placed in a vacuum furnace retort, which was evacuated, and backfilled with argon. The pressure in the furnace was set at 100 microns with argon flowing and the vacuum pump running. The furnace temperature was ramped to 650° C. in 50° C. increments, held until temperature equalized, then ramped up to 950° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing the oxygen, was then removed from the metal powder by acid leaching.

Properties of the resultant Ta powder were as follows:

Particle Size: −100 mesh (less than 150 microns)

Oxygen: 240 ppm

Surface Area: 462 $cm^2$/gm

Specific Oxygen: 0.52 microgram/$cm^2$

EXAMPLE 2

This example illustrates reduction of a tantalum powder with less than 200 ppm oxygen by the deoxidation of tantalum hydride under a partial pressure of argon. Tantalum hydride powder, made by conventional method, was blended with 0.3 wt. % Mg and placed in a vacuum furnace retort, which was evacuated, and backfilled with argon. The pressure in the furnace was set at 100 microns with argon flowing and the vacuum pump running. The furnace temperature was ramped to 850° C. in 50° C. increments, held until temperature equalized, then held for 3 hours. It was then ramped up to 950° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing the oxygen, was then removed from the metal powder by acid leaching.

Properties of the resultant tantalum powder were as follows:

Particle Size: −100 Mesh (less than 150 micrometers)

Oxygen: 199 ppm

Surface Area: 465 cm2/gram

Specific Oxygen: 0.43 microgram/cm$^2$

EXAMPLE 3

Tantalum powder with less than 100 ppm oxygen was produced by the deoxidation of tantalum hydride under a positive pressure of argon. Tantalum hydride powder, made by conventional method, was blended with 0.3 wt. % Mg and placed in a production vacuum furnace retort, which was evacuated, and backfilled with Argon. The pressure in the furnace was set at 860 Torr with argon flowing. The furnace temperature was ramped to 650° C. in 50° C. increments, held until temperature equalized, then held for 4 hours. It was then ramped up to 1000° C. in 50° C. increments. When the temperature equalized at 1000° C. it was held for six hours. After six hours at 1000° C. the furnace was shut down and cooled to room temperature. Once the furnace cooled its powder content was removed from the retort. The magnesium, containing the oxygen, was then removed from the metal powder by acid leaching.

Properties of the resultant Ta powder were as follows:

Particle Size: −100 Mesh (less than 150 microns)

Oxygen: 77 ppm

Surface Area: 255 cm2/gm

Specific Oxygen: 0.30 microgram/cm$^2$

EXAMPLE 4

The following tests were conducted to show that the tantalum, niobium or alloy powder, of the present invention, is compressible, and to show the strength of the powder of the present invention. Tantalum powder having an oxygen content of less than 300 ppm, prepared by a procedure similar to the procedure of Example 1, was utilized as the starting powder. The starting powder was placed in a die and pressed at various pressures, into tablets. The density of the tablets as a function of the pressing pressures were as follows:

| Pressure (lbs./sq. in.) | Density (% of Theoretical) |
| --- | --- |
| 40,000 | 82 |
| 60,000 | 88 |
| 80,000 | 92 |
| 90,000 | 93 |

These results show that the powders of the present invention are compressible.

To show the strength of the powder of the present invention after mechanical pressing tantalum powder having an oxygen content of less than 300 ppm, prepared by a procedure similar to the procedure of Example 1, was placed in a die and pressed, at various pressures, into bars about ½ inch by about ½ inch, by about 2 inches. The transverse rupture strength of these bars was as follows:

| Pressure (lbs./sq. in ) | Transverse Rupture Strength (lbs./sq. in.) |
| --- | --- |
| 40,000 | 2680 |
| 60,000 | 5385 |
| 80,000 | 6400 |
| 90,000 | 8360 |

Generally a minimum strength of about 2000 lbs./sq. in. is desired for normal handling of pressed compacts. The data from the compressibility test together with the rupture strength test indicates that this strength level can be obtained with the powder of the present invention formed at a pressure of about 40,000 PSI.

Other Embodiments

In addition to the embodiments indicated above, the following further embodiments can be made.

A. The production of a formed tantalum product having an oxygen content of less than 300 ppm can be achieved by cold isostatic pressing of various kinds of known Ta/Nb powders to form a compact, followed by a hot isostatic pressing (HIP) step to densify the compact and then thermomechanical processing of the powder compact for further densification and completion of the bonding. Preferably, tantalum powder having an oxygen content of less than 300 ppm, prepared by a procedure similar to the procedure of Example 1, would be utilized as the starting powder. This powder would be cold isostatically pressed at 60,000 pounds/sq. in. and room temperature, into a compact with rectangular cross-section, then hermetically encapsulated and hot isostatically pressed (HIPed) at 40,000 lbs./sq. in. and 1300 degrees C. for 4 hours. The HIPed compact would be unencapsulated and converted to sheet or foil by thermomechanical processing steps.

B. A similar process of just cold isostatic pressing, sintering and thermomechanical processing using tantalum powder having an oxygen content of less than 300 ppm, prepared by a procedure similar to the procedure of Example 1, can be conducted by cold isostatically pressing at 60,000 lbs./sq. in. into a bar shape preform. This preform would be sintered at 1500 degrees C for 2 hours in a vacuum of less than about 0.001 Torr to yield a preform having a density of about 95% theoretical density (Th) and less 300 ppm oxygen. The sintered preform would be converted into sheet and foil by thermomechanical processing steps.

C. Formed tantalum bar and wire having an oxygen content of less than 300 ppm can be made by hot extrusion and thermomechanical processing using tantalum powder having an oxygen content of less than 300 ppm, prepared by a procedure similar to that of Example 1, as the starting powder. This powder would be hermetically encapsulated and then extruded through a circular die at 10000° C. The extruded product would have oxygen content of less than 300 ppm. The extruded preform was converted into rod and wire by the thermomechanical processing steps.

D. Another such process sequence is cold isostatic pressing, hot extrusion and thermomechanical processing utilizing tantalum powder having an oxygen content of less than 300 ppm, prepared by a procedure similar to that of Example 1, as the starting powder. This powder would be cold isostatically pressed, hermetically encapsulated then extruded at 1000° C. The extruded product would have an oxygen content of about 300 ppm. It would be converted into rod and wire by the thermomechanical processing steps.

E. Production of a formed tantalum sheet or foil having an oxygen content of less than 300 ppm by hot extrusion and thermomechanical processing can be made, using tantalum powder having an oxygen content of less than 300 ppm, prepared by a procedure similar to the procedure of Example I, as the starting powder. This powder can be hermetically encapsulated then extruded through a rectangular die at 1000° C. to produce an extruded product having oxygen content of less than 300 ppm. The extruded product can be converted sheet or foil by the thermomechanical processing.

F Tantalum sheet or foil with an oxygen content of less than 300 ppm can be produced using the Example 1 powder by cold isostatic pressing, hot extrusion and thermomechanical processing. This compact made by cold isostatically pressing could be hermetically encapsulated then extruded at 1000° C. to produce an extruded product with an oxygen content of about 300 ppm which can be converted into sheet and foil by thermomechanical processing steps.

G. A formed product of tantalum, produced by mechanical pressing and sintering. Tantalum powder having an oxygen content of less than 300 ppm, prepared by a procedure similar to the procedure of Example 1, would be utilized as the starting powder. This tantalum powder was placed in a die and pressed, using uniaxial pressure, into a tablet with a pressed density of about 80% of the theoretical density. This tablet was then sintered at 1500° C. for 2 hours in a vacuum evacuated to less than about 0.001 Torr. The final sintered tablet has an oxygen content of less than 300 ppm.

H. Tantalum products having an oxygen content of less than 300 ppm can be prepared by mechanical pressing, sintering, repressing and resintering. Tantalum powder having an oxygen content of less than 300 ppm, prepared by a procedure similar to the procedure of Example 1, can be utilized as the starting powder. It is placed in a die and mechanically pressed, using uniaxial pressure. The pressed tablet should be then sintered at 1500° C. for 2 hours in a vacuum evacuated to less than about 0.001 Torr. The sintered tablet would then be repressed and resintered at 1500 degree C for 2 hours in a vacuum evacuated to less than about 0.001 Torr. The resintered tablet will have oxygen content of less than 300 ppm and be suitable for thermomechanical processing to produce a formed tantalum product I. Tantalum product having oxygen content of less than 300 ppm can be prepared by spray deposition, using starting powder having an oxygen content of less than 300 ppm, prepared by a procedure similar to the procedure of Example 1. The powder can be spray deposited up to a thickness of 0.1 inch on an alloy substrate formed from stainless steel. Particle size, flow properties and oxygen content of the powder will be suitable for consolidation by spray deposition.

J. Plasma activated sintering can be used for production of a formed tantalum product having oxygen content of less than 300 ppm. Tantalum powder having an oxygen content of less than 300 ppm, prepared by a procedure similar to the procedure of Example 1, would be utilized as the starting powder. It would be poured into a tantalum foil lined graphite die and graphite punches inserted into the die from both ends. The die punch assembly is placed on a water-cooled steel block. Another water-cooled steel block is brought in contact with the top punch. The water-cooled steel block is attached to a hydraulic piston on the top and the base on the bottom to dissipate the heat accumulated during the consolidation. The top and bottom water-cooled steel blocks are also attached to the positive and the negative ends of a DC power supply.

The powder filled die punch assembly is provided in a chamber. The chamber should be evacuated to 500 milliTorr. The consolidation would be carried out in two stages. In the first stage, the intent is primarily to purify the powder via plasma sputtering of particle surfaces. A pressure of about 4300-psi would be applied on the powder through the punches and a pulsed DC current of 1000 A would be passed through the powder. These conditions would be maintained for two minutes.

During the second stage the pressure would be raised to about 6500 psi and non-pulsed DC current of 4500 A passed through the powder. These conditions would be maintained for two minutes. At the end of the cycle, the power to the punches is turned off, the vacuum pump is turned off and the evacuation chamber backfilled with nitrogen. The die punch assembly is allowed to cool to the room temperature and the consolidated tantalum sample is removed from the die. The consolidation cycle would be about eight minutes. The sintered preform will have a density of over 95% of the theoretical density and oxygen content of less than 300 ppm.

K. A niobium powder with less than 300 ppm oxygen can be produced by the deoxidation of niobium hydride under partial pressure of argon. Niobium hydride powder would be blended with 0.3 wt.-% Mg and placed in a vacuum furnace retort, which is evacuated, and backfilled with argon. The pressure in the furnace would be set at 100 microns with Argon flowing and the vacuum pump running. The furnace temperature would be ramped to 650° C. in 50° C. increments, held until temperature equalized, then ramped up to 950° C. in 50° C. increments. When the temperature equalized at 950° C. it would be held for two hours. After two hours at 950° C. the furnace is shut down. Once the 3 furnace cools its powder content is removed from the retort. The magnesium, containing the oxygen, would then be removed from the metal powder by acid leaching to produce the resulting niobium powder having an oxygen content of less than 300 ppm.

Comparative Example I (a Two Step Process)

The following comparative examples illustrate the benefits of the present invention. This example illustrates the prior art. Tantalum hydride powder made by conventional methods was dehydrided at 650° C. for ten hours then cooled and removed from the retort. It was then blended with 0.5-wt % Mg and placed in a vacuum furnace retort, which was evacuated, and backfilled with argon. The pressure in the furnace was set at 860 Torr with argon flowing. The furnace temperature was tamped to 1000° C. When the temperature equalized at 1000° C. it was held for six hours. After six hours at 1000° C. the furnace was shut down and cooled to room temperature. Once the furnace cooled, its powder content was removed from the retort. The magnesium-containing oxygen was then removed from the metal powder by acid leaching.

Properties of the resultant Ta powder were as follows:
Particle size: −100 mesh (less than 150 microns)
Oxygen: 145 ppm
Surface area: 250 $cm^2$/gm
Specific oxygen: 0.58 microgram/$cm^2$ A comparison of this example with Example 3 above illustrates that the deoxidation of tantalum hydride results in significantly lower levels of oxygen in tantalum powder.

Comparative Example II

Tantalum hydride powder made by conventional methods was dehydrided at 650° C. for ten hours then cooled and removed from the retort. It was then blended with 0.5 wt-% Mg (present invention) and placed in a vacuum furnace retort, which was evacuated and backfilled with argon. The pressure in the furnace was set at 100 microns with argon flowing and the vacuum pump running. The furnace temperature was ramped to 850° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing oxygen, was then removed from the metal powder by acid leaching.

Oxygen contents of deoxidized tantalum hydride (Example 2) and tantalum powder are given below for various size fractions obtained from the one step (present invention) and two step (Comparative II) processes.

| Particle size | Oxygen on Deoxidized Tantalum Hydride (in ppm) (one thermal cycle) | Oxygen of Deoxidized Tantalum (in ppm) (two thermal cycles) |
| --- | --- | --- |
| Minus 100 mesh | 199 | 345 |
| 100/140 | 86 | 182 |
| 140/200 | 107 | 207 |
| 200/270 | 146 | 270 |
| 270/35 | 147 | 328 |
| Minus 325 | 367 | 615 |

Numerous variations and modifications may obviously be made without departing from the present invention. Accordingly, it should be clearly understood that the forms of the present invention herein described are illustrative only and are not intended to limit the scope of the invention.

I claim:

1. A process for producing metal powders suitable for forming into mill products or fabricated parts by powder metallurgy, comprising the steps of:

providing a minus 100 mesh hydride powder of a first metal, said first metal being selected from the group consisting of tantalum, niobium, and alloys of said metals with each other or one or both of them with other metals, heating said hydride of the first metal in the presence of a metal having a higher affinity for oxygen than first metal's affinity to remove hydrogen and oxygen in a single heating cycle, then removing the metal having a higher affinity for oxygen from the metal, to form a powder of the first metal with oxygen content less than 300 ppm.

2. The process of claim 1 wherein the final oxygen content of the metal powder is less than 200 ppm.

3. The process of claim 1 wherein the final oxygen content of the metal powder is less than 100 ppm.

4. The process of claim 1 wherein said heating is performed under vacuum.

5. The process of claim 1 wherein said heating is performed under a positive pressure of argon.

6. The process of claim 1 wherein said metal of greater affinity is selected from the group consisting of magnesium and calcium.

7. The process of any of claims 1, 2 or 3 wherein said metal powder has a transverse rupture strength of between about 1,100 to about 7,700 psi when compressed with a pressure of between 40,000 to about 100,000 psi.

8. A process for producing formed powder metallurgy products comprising the steps of:

providing a hydride powder of a first metal, which is substantially a refractory metal having an oxygen content greater than a target level, heating said hydride of the first metal in the presence of a metal having a higher affinity for oxygen than the hydride to remove hydrogen and oxygen in a single heating cycle, removing the metal having a higher affinity for oxygen from the first metal, to form a metal powder with an oxygen content less than the target level, and forming a metallurgical product from said metal powder with oxygen.

9. The process of claim 8 wherein said metallurgical product is formed by compressing said metal powder to greater than 85% of theoretical.

10. The process of claim 8 wherein the forming step is a sequence of steps selected from the group of sequences consisting of (a) cold isostatic pressing, hot isostatic pressing and thermomechanical processing, (b) cold isostatic pressing, vacuum sintering and thermomechanical processing, (c) hermetic encapsulation, hot extrusion and thermomechanical processing, (d) cold isostatic pressing, hermetic encapsulation, hot extrusion and thermomechanical processing and (e) uniaxial cold pressing, vacuum sintering, repressing and resintering.

11. The process of claim 8, wherein the forming step comprises spray forming, alone or in combination with other steps.

12. The process of claim 8 wherein the forming step comprises plasma activated sintering alone or in a combination with other steps.

13. The process of any of claims 8–12 wherein the first metal is selected from the group consisting of tantalum, niobium and alloys of said metals with each other and/or other metals.

14. A formed product as made by the process of claim 13.

15. A formed product as made by the process of claim 8.

* * * * *